United States Patent
Hamp et al.

(10) Patent No.: US 6,816,175 B1
(45) Date of Patent: Nov. 9, 2004

(54) ORTHOGONAL BROWSING IN OBJECT HIERARCHIES

(75) Inventors: Birgit Hamp, Stuttgart (DE); Adrian Mueller, Boeblingen (DE); Frank Neumann, Boeblingen (DE); Annette Opalka, Stuttgart (DE); Roland Seiffert, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/396,595

(22) Filed: Sep. 15, 1999

(30) Foreign Application Priority Data

Dec. 19, 1998 (EP) .............................................. 98124149

(51) Int. Cl.[7] .............................................. G06F 15/00
(52) U.S. Cl. ...................... 345/854; 345/853; 345/845; 345/828; 707/100
(58) Field of Search ................................ 707/100, 104, 707/10; 345/845, 854, 828, 734, 853

(56) References Cited

U.S. PATENT DOCUMENTS

| | | | | |
|---|---|---|---|---|
| 5,414,809 A | * | 5/1995 | Hogan et al. ................... 707/3 |
| 5,644,740 A | * | 7/1997 | Kiuchi ........................ 345/845 |
| 5,895,474 A | | 4/1999 | Maarek et al. |
| 5,900,870 A | * | 5/1999 | Malone et al. ............... 345/845 |
| 5,978,790 A | * | 11/1999 | Buneman et al. ............... 707/2 |
| 5,999,179 A | * | 12/1999 | Kekic et al. ................. 345/845 |
| 6,026,388 A | * | 2/2000 | Liddy et al. ..................... 707/1 |
| 6,144,962 A | * | 11/2000 | Weinberg et al. ............. 707/10 |
| 6,272,537 B1 | * | 8/2001 | Kekic et al. ................. 709/223 |
| 6,470,383 B1 | * | 10/2002 | Leshem et al. ............. 709/223 |

FOREIGN PATENT DOCUMENTS

| | | |
|---|---|---|
| JP | 02-120980 | 5/1990 |
| JP | 06-251062 | 9/1994 |

* cited by examiner

*Primary Examiner*—Shahid Alam
*Assistant Examiner*—Cam-Y Truong
(74) *Attorney, Agent, or Firm*—Richard M. Ludwin, Esq.; McGinn & Gibb, PLLC

(57) ABSTRACT

The present invention relates to means and a method executable by a computer system for navigation within a tree structure with leaf nodes representing arbitrary types of objects, i.e. of related data treated as a unit.

According to the current teaching a travel point representation step is suggested, wherein after selection of at least one non-leaf node as travel point only the path and non-leaf nodes in said tree structure from said travel point to the root of said tree structure is represented in a tree view area. Moreover the complete sub-tree of said travel point is represented in said tree view area. In addition or alternatively after selection of said travel point, a travel box is represented for said travel point, said travel box representing object identifications of all objects of all leaf nodes in said sub tree of said travel point.

13 Claims, 8 Drawing Sheets

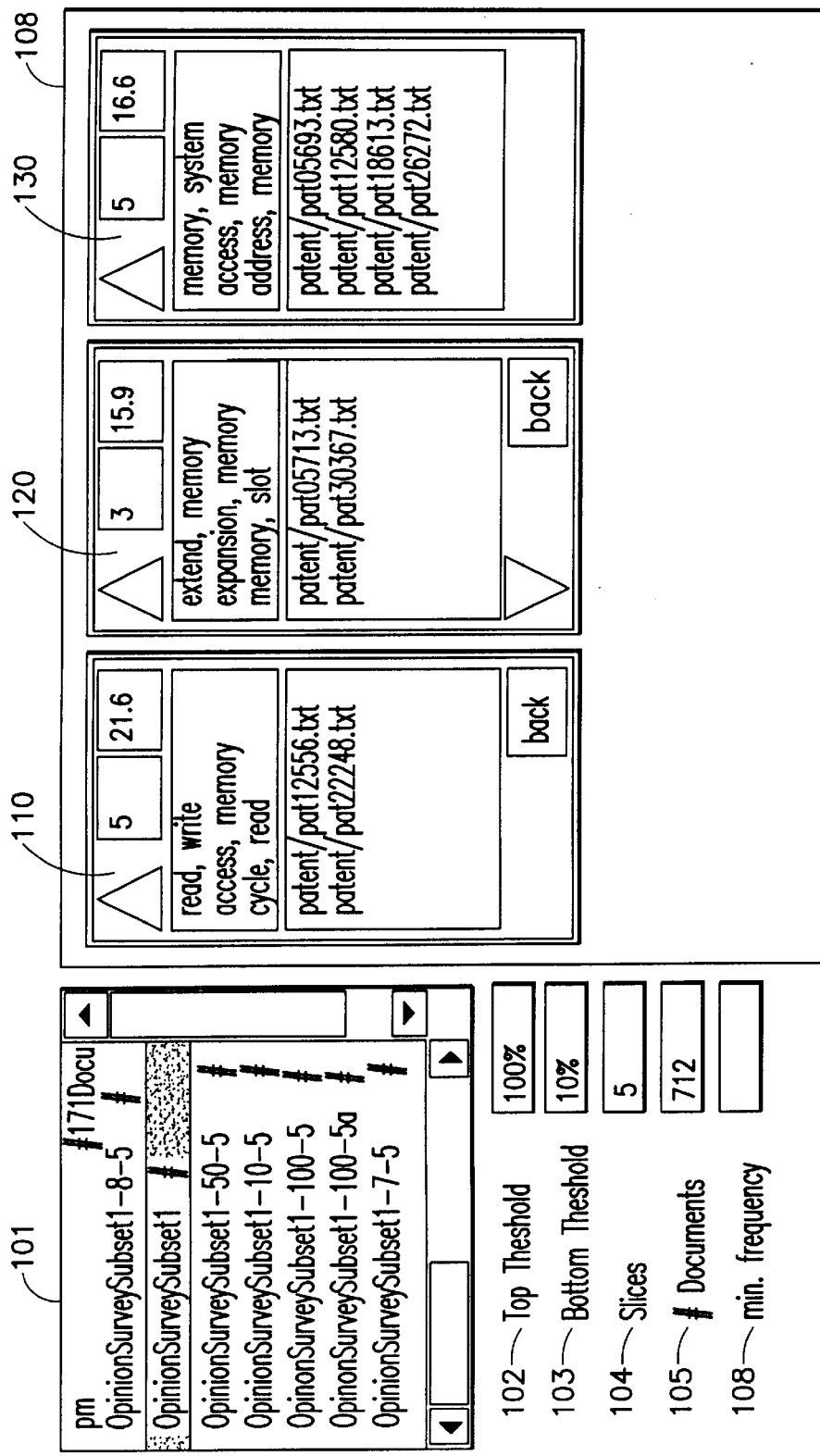

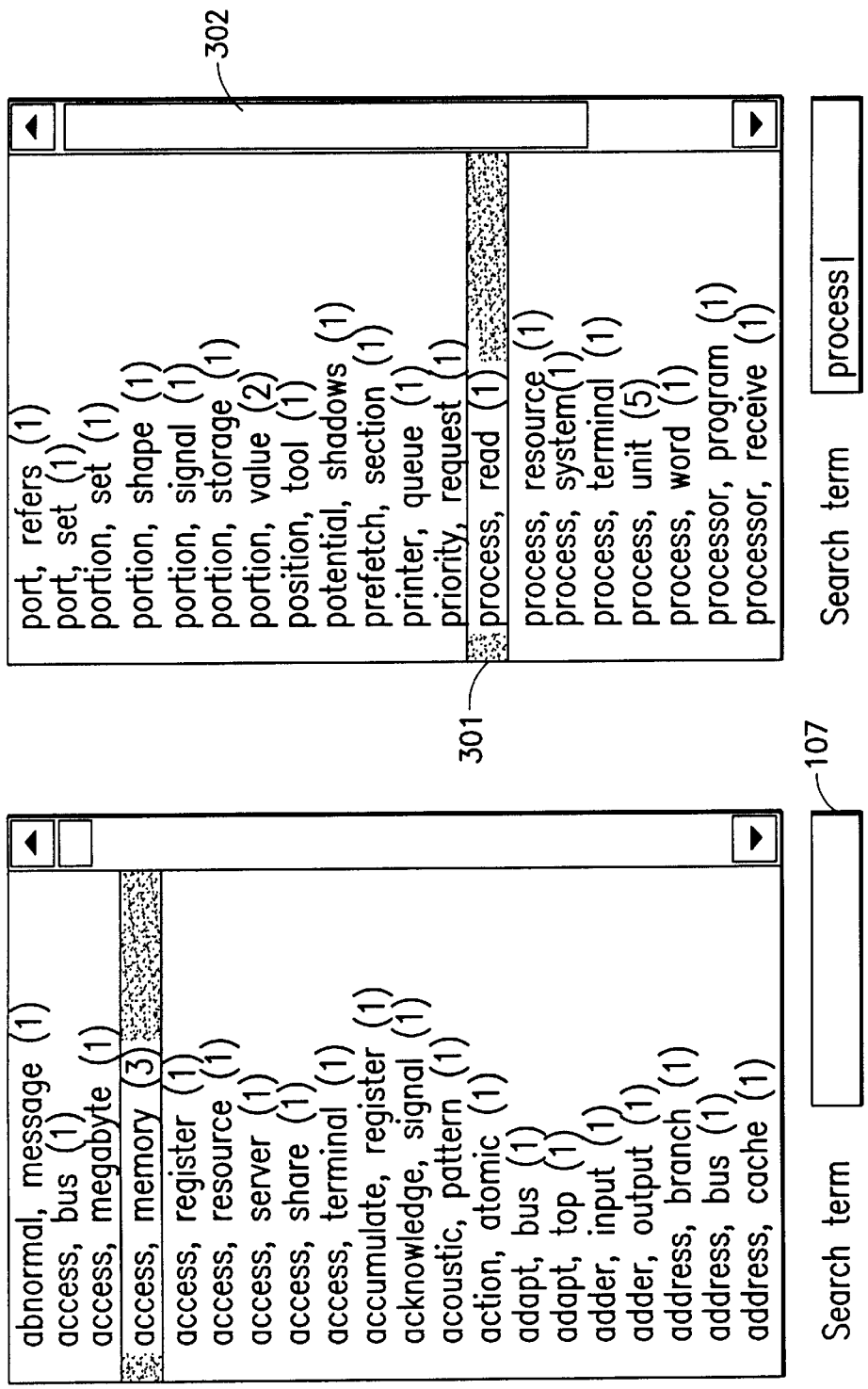

ORTHOGONAL BROWSING IN OBJECT HIERARCHIES

1 BACKGROUND OF THE INVENTION

1.1 Field of the Invention

The present invention relates to means and a method executable by a computer system for navigation within a tree structure with leaf nodes representing arbitrary types of objects, i.e. of related data treated as a unit.

1.2 Description and Disadvantages of Prior Art

"The Information Age", a fairly commonly heard expression these days, but one whose consequences seem to be ignored as frequently as it is used. There is no denying the fact that we are in the midst of a long term explosion of information that shows no signs of slowing down, or even accelerating less forcefully. The questions this fact raises are many, but one of the most significant, if not the most significant, is the question of organisation.

The Information Age has lived up to it's promise of "information at our fingertips", but the sheer volume of the information available makes it nearly impossible to find any given set of specific information, much less navigate intelligently through the constantly growing sea of data. The additional question of attempting to somehow display information about the relations between various items, and the context of the item, adds still another level of complexity. When we start to look at large collections of related data, with additional information about context and relations ("Complex Knowledge Structures")., one enters a territory even less navigable than the raw data—the additional information should help us understand the raw facts, but again the sheer amount of information overloads us and renders the putative assistance of context a hindrance.

The computer is that tool, and it has become the main ally in the quest to force some sort of order, or structure, onto the apparently endless chaotic mass of information. When one starts looking at new ways to order and present data using computers, then the question becomes one of ergonomics. To wit, how do we organise and display these complex knowledge structures so that humans can navigate through them with ease, find what they are looking for, and generally make sense of the information in context? How do we select appropriate data from the mass of information, and once we have found it, how do we allow the user to interact with it?

Based on this background the display of large amounts of information has been an active area of research in a diversity of areas since decades now. Work on man-machine interfaces, information retrieval, graph layout, cognitive science, virtual reality—each area concentrates on certain aspects or principles of the problem. Within the context of knowledge management, one has to deal with a widespread spectrum of information types: raw texts, structured texts, annotated information, partly automatically generated information entities, which obey yet unknown structural rules, relational and hierarchical meta information. Hence, the capabilities of information browsers or navigators can be measured by the degree they are able to handle some of the most important expectations like:

to display partly structured information of varying size to ease the perception of the ordering of the information to allow for interactive exploration of information spaces To put it in different words: in this context where we discuss a mixture of human-edited information carriers (written text) and machine-generated structures (object hierarchies, descriptive labels i.e. "terms"), an information structure becomes only valuable by perception, not per se. The question remaining is: which aspects of this mixed information might be stressed to achieve optimal perception. In the following, we compare some recent work in cognitive science, graph layout, information retrieval and knowledge management by their respective modalities.

Y. Arens and E. Hovy, How to Describe What? Towards a Theory of Modality Utilization, Meeting of Cognitive Science Society, Cambridge, Mass Cognitive Science Society, p. 487–494, August 1990 describe a theory of modality utilization where they distinguish between three aspects of an information entity: the inner properties of the object, the properties of the class the object belongs to and the properties of a selected set of objects, i.e. the information to be discussed and residing in current focus.

These three aspects can be found in different designs of tree and graph browsers, graphical query languages, graphical information retrieval front ends, and general multimedia information systems. Prior to a more detailed analysis one can expect that all implemented systems will most radically differ by the chosen paradigm for their means of interactive exploration of information structures.

Information retrieval (IR) front ends like GUIDO and VIBE, proposed by Robert R. Korfhage and Kai A. Olsen, Information Display: Control of Visual Representations, Workshop on Visual Languages, IEEE Computer Society, p. 56–61, October 1991, provide a pre-structured information space to visualize document/document and document/term binary relations. The space is defined by (query) terms which span a certain geometry (e.g. a diamond-shaped panel with triangular segments). Document representations (small rectangles) are positioned to the segment where they have the greatest overlap with terms owning this segments Hierarchical information is hardly displayed for the sake of a conceptual strict layout paradigm. On the other hand it is well known that hierarchical organization approaches belong to the most powerful classification concepts conforming to a large extend with human way of thinking.

IR-system graphical user interface (GUI) designs based upon a 3D-space mostly concentrate on the display of the hierarchical aspect of information only. Systems using Cone-Trees, refer for instance to George G. Robertson and Jock D. Mackinlay and Stuart K. Card, Cone Trees: Animated 3D Visualizations of Hierarchical Information, Proceedings of ACM CHI'91 Conference on Human Factors in Computing Systems, p. 189–194, 1991, map term/document and other hierarchical relational information directly to a 3D layout algorithm. Interactive graphical operations like zoom and rotate provide means to gain an overview and inspect details. The design is centered around the user, who has to explore the (3D) space. As consequence and deficiency, the cognitive load is typically very high if one has to identify and compare properties for a certain set of objects.

Another specific technique suggested for the representation of complex knowledge structures, beloging to the same class exploiting the 3D space, is that of using the properties of hyperbolic geometry to provide a view that contains both an inherent focus (channelling user attention to some current node) and a context, i.e. information about the relationship between the current node and other nodes in the system, by navigating through a network of nodes.

Arbitrary data structures like entity-relationship models are typically mapped to a—more or less—specialized graph- or tree layout algorithm. The semantics of the relations is mapped to certain aspects of the graph layout. In GraphLog, refer for instance to Stuart K. Card and George G. Robertson and Jock D. Mackinlay, The Information Visualizer, An Information Workspace, Proceedings of ACM CHI'91 Conference on Humanfactors in Computing Systems, p. 181–188, 1991, one can even formulate structural/semantic queries by drawing objects, thus the user of this system works upon his own conceptual model of the underlying semantics. However, this paradigm lacks means to express the vague semantics and relationships that is buried within the objects under consideration (eg the topic of a text item, or the relatedness of two documents).

Hypertext-based systems interpret structural information (the hyperlinks) in a different way. Each hyper link represents an explicit relation (based upon topic, annotation, part-of etc. information) between different information entities. The layout of the global structure in systems like NoteCards, refer for instance to C. Foss, Effective Browsing in Hypertext Systems, Conference of RIAO, p. 82–98, 1988, is optimized to ease the interactive exploration and editing of the hyper space, since this is the intended usage. A drawback of browsing through hyperlinked information is the accompanying sense of disorientation as often reported by users. Two rather whimsically named problems that arise from navigation in hypertext have been identified: the "Embedded Digression Problem", and "The Art Museum Phenomenon". The "Embedded Digression Problem" embraces the difficulties which arise from the multiplicity of choice offered by most hypertexts. Users may delve into a richly connected network of information which may serve to distract them from their chosen path and cause them to lose their place in the document. Alternatively, users may forget to return from a digression or forget to follow a path they had planned earlier. The "Art Museum Phenomenon" refers to a group of problems associated with learning through browsing. Browsing is an open and exploratory information-seeking activity which involves scanning and tracing ideas from one node to another in an often vague and non-specific manner. The non-directive nature of browsing means that users may often wander through a hypertext without stopping to study or think about the ideas the document presents. Consequently, users may be unable to recognise which nodes have been visited, or which parts of the exploration space remain to be seen.

Tree- and graph-layout algorithms, as described by K. Sugiyama and K. Misue, Visualization of structural information Automatic drawing of Compound Digraphs, IEEE Transactions on Systems, Man and Cybernetics, 21(4) p. 876–892, July/August 1991 for instance, typically concentrate on either global optimization (number of crossing links, space, distance) of conflicting properties of the overall graph layout. Or they must not violate one layout criteria (e.g. no crossing links for circuit design), but have to sacrifice other. Both variants exhibit that these algorithms are mainly designed to overcome technical shortcuts (like limitation of presentation space for instance), but must not be considered the core design of an information exploring environment.

Returning to the theory of "modality utilization", one can conclude that none of the discussed system designs covers all three aspects of an information object in a unique way. Bringing interactivity between visualized structures and a user into the game shows even more drawbacks and confirms the need for a display design with a radical different technique.

1.3 OBJECTIVE OF THE INVENTION

The invention is based on the objective to improve the visualization of large and complex object structures and the interactive navigation of users within such environments. More particularly the invention is based on the objective to provide above improvements in the context of complex hierarchical organized object structures allowing the user to detect and gain new insights in the relationship between the objects and at the same time allowing to focus only on those aspects of the objects the user is really interested in.

2 SUMMARY AND ADVANTAGES OF THE INVENTION

The objectives of the invention are solved by the independent claims. Further advantageous arrangements and embodiments of the invention are set forth in the respective subclaims.

The invention teaches a method executable by a computer system for navigation within a tree-structure. The tree-structure comprises at least one leaf-node said leaf-node representing an object and the tree structure comprises at least one non-leaf-node. According to the invention a travel point representation step is suggested, wherein after selection of at least one non-leaf node as travel point only the path and non-leaf nodes in said tree structure from said travel point to the root of said tree structure is represented in a tree view area. Moreover the complete sub-tree of said travel point is represented in said tree view area. In addition or alternatively after selection of said travel point, a travel box is represented for said travel point, said travel box representing object identifications of all objects of all leaf nodes in said sub tree of said travel point.

The proposed method supports the hierarchical organization approaches from which it is known that it represents one of the most powerful classification concepts conforming to a large extend with human way of thinking. For this organization principal an approach is proposed which on one side significantly reduces the amount of displayed data and which on the other side significantly enriches the displayed data. The amount of displayed data is significantly decreased as the tree structure between a travel point and the root of the tree is reduced to the path between them. The amount of displayed data is significantly enriched as the complete sub-tree below a travel point is collapsed to a "flat" structure comprising all leaves of the sub-tree of a certain travel point. Therefore below a travel point an object centered view is introduced. The non-hierarchical data display has the advantage that the user is always presented with all of the objects at the leaves under a certain node in the hierarchical tree. Thus the relationship between the basic objects and the structural position within the collection is always exposed. The user gets a much better impression for the "similarity" of objects and their relationship to other objects by this unique display method easing the perception of the ordering of the information. In terms of modality utilization the "properties of the class" an object belongs to and the "properties of a selected set of object" reside in a common focus. Only the data the user is really interested in is displayed—the non-selected branches of the tree are folded away and only the direct path to the root is displayed.

Additional advantages are accomplished if said leaf-node is associated with object-attributes of the objects and if the non-leaf-node is associated with the object-attributes of all leaf-nodes of the sub-tree of the non-leaf-node. Within said travel box at least one object-attribute of said travel point is represented in said travel-point-representation-step. The travel point is marked visually in said travel-point-representation-step.

Therefore the travel boxes provide a "second dimension" to view in parallel on the object structure. This second dimension is a "content oriented" view as the attributes related to the semantic and contents of the objects are displayed. In terms of modality utilization the "inner properties" of the displayed objects are unveiled. This approach allows a user to explore huge object (for example documents) collections and learn about their structure. The user can gain insights from different perspectives on the data.

Additional advantages are accomplished by an upward-navigation-step, wherein, after selection of a parent-node of a current travel point, the travel-point-representation-step is performed with said parent-node as new travel point. In a downward-navigation-step, after selection of a child-node of a current travel point, the travel-point-representation-step is performed with said child-node as new travel point. The parent-node and the child-nodes are selectable in the tree-view-area, and/or in said travel box by selection of an upward-control-element and downward-control-element respectively. A direct child-node of the travel point is selectable in the travel box by selection of one of the following: an object-identification or an object-attribute together with the selection of a downward-control-element.

These features provide a user with dynamic navigation capabilities operating in two dimensions. Navigation on object level is possible from the travel boxes and navigation with respect to the position within the hierarchical structure is also possible. Within a travel box a branch in the tree can be followed down to the leaves via a particular object, independent of the depth of the object in the tree. This can lead to new insights about the overall structure of the collection and the grouping of the objects. Within the hierarchical structure the travel points can be moved and the tree expands and partially collapses respectively. Navigation on either way (object level or tree hierarchy) causes both views to be dynamically updated, thus both views are dynamically related and offer a flexible and easy to access overview over the data. The user can explore huge object collections and learn about their structure in a very interactive and at the same time easy to handle manner. The user can gain insights from different perspectives on the data and navigate according to the position in the tree, attributes or the objects themselves, each navigation step being reflected on several levels. This new browsing technology is a key to evolving technology areas such as Knowledge Management and Content Management, where a user has to deal with automatically generated hierarchies. Learning about their structure in a short time and evaluating their content becomes more and more important.

Additional advantages are accomplished by a navigation-initialization-step. After selection of an object-attribute either from an attribute-list-area, showing one or more object-attributes of said tree-structure, or from said travel box, the navigation-initialization-step determines the non-leaf-nodes being the direct parent-nodes of leaf-nodes associated with said selected object-attribute. It selects the determined non-leaf-nodes as travel points and performs the travel-point-representation-step for said travel points.

Thus the proposed attribute list area provides a "third dimension" for navigation to a user. The attribute list serves as a selection list to access the leaves of the hierarchy, i.e. the objects. Only those leaves are displayed which satisfy the select criteria. The attribute list is extendible by various search criteria, sort criteria etc. The data is presented in a clear and easy to access manner. Only the information a user is interested in is displayed as he can choose the entry point to the data from the attribute list. Ideally all attributes of all objects of the whole tree structure are presented in the attribute list area.

Additional advantages are accomplished by storing a travel-point-identification during navigation in the tree-structure in a history-record. By means of a history-navigation-step, wherein, after selection of a history-control-element in the travel box, the previous travel point with respect to said history-record is used for performing the travel-point-representation-step.

Due to this history function the user has the option to go back the same path within the hierarchy he came, or follow new paths.

Additional advantages are accomplished if the objects represent documents and/or the object-attributes are lexical-affinities (refer to the description below for an understanding of lexical affinities according to the state of the art) of the document and if the object-attributes are ranked according to the frequency of occurrence of said lexical-affinities.

Based on an aggregation of these features a navigator results representing a powerful tool for exploration of data spaces originating in the technology area of information mining.

3 BRIEF DESCRIPTION OF THE DRAWINGS

FIG. 1 is an overview of the GUI navigator which combines the elements of the three exploration dimensions of an "attribute selection list", a "hierarchical tree browser" and "travel boxes" to explore large object collections.

FIG. 2 visualizes an example of an attribute list displaying all attributes which appear at the nodes in the tree structure; the number of nodes for which an attribute is descriptive is indicated in brackets behind the individual attributes.

FIG. 3 visualizes an example of an attribute list focussing on the search capability allowing a user to enter a search term which takes him to the attribute he searched for or, if no exact match exists, the orthographically nearest match is selected.

Figure 6:
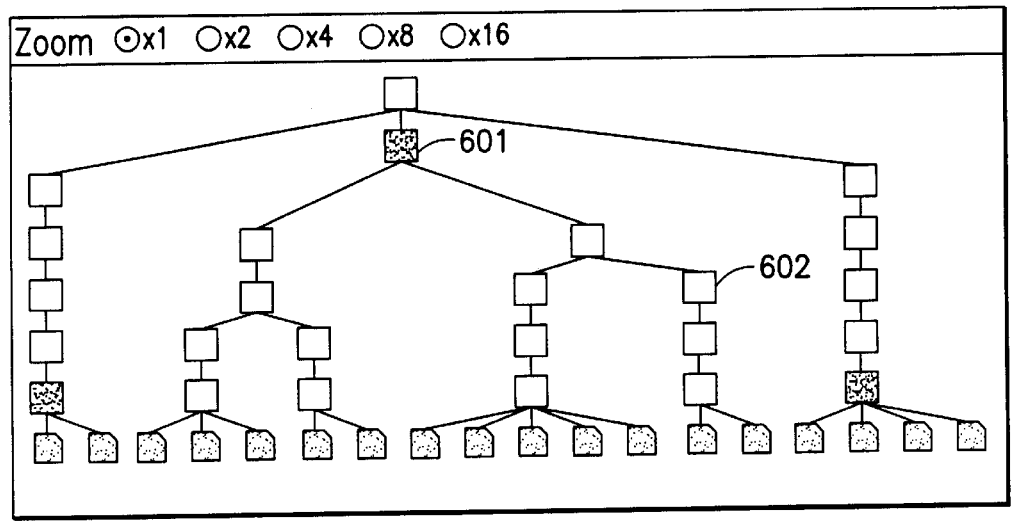
FIG. 6 depicts the tree view area of FIG. 5 wherein the middle travel point has been moved upward to the root node a further step; dragging the travel point up again, expands the subsumed tree further.
Figure 7:
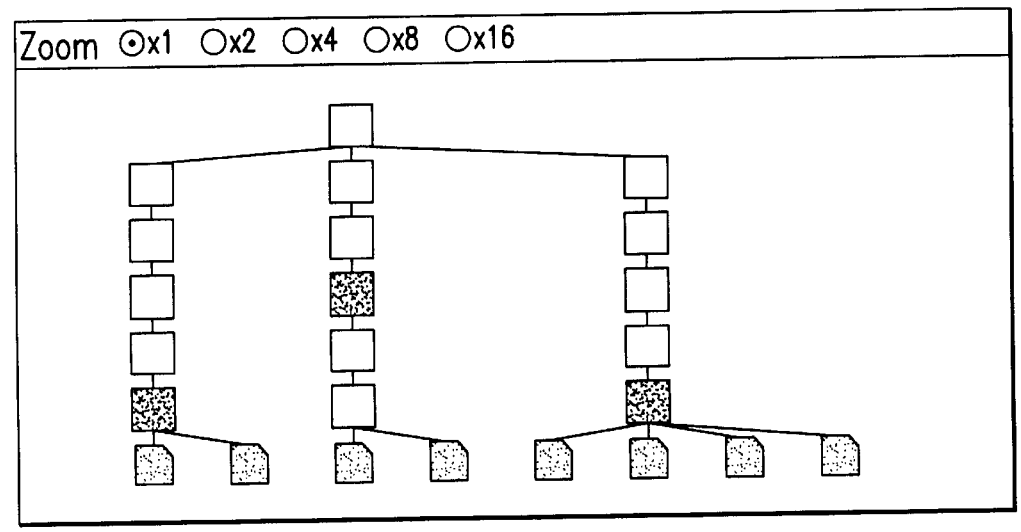

FIG. 7 reflects the tree view of FIG. 6 after a downward movement of the middle travel point; in the second branch (counted from the right side) the user followed a new path downwards, by moving the middle travel point.

Figure 4:
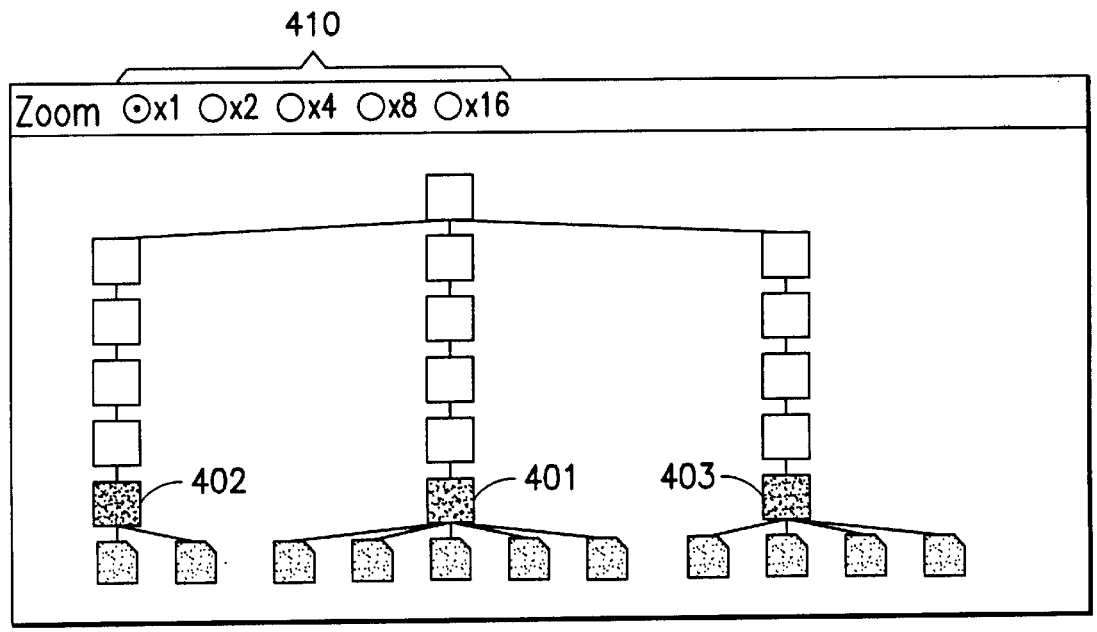
FIG. 4 shows an example of a tree view area in an initial state comprising three travel points displayed within the hierarchical tree further displaying the objects comprised within the subtree of these travel points and the direct paths of said travel point to the root of the tree. The user can zoom into this view by indicating a zooming factor.
Figure 8:
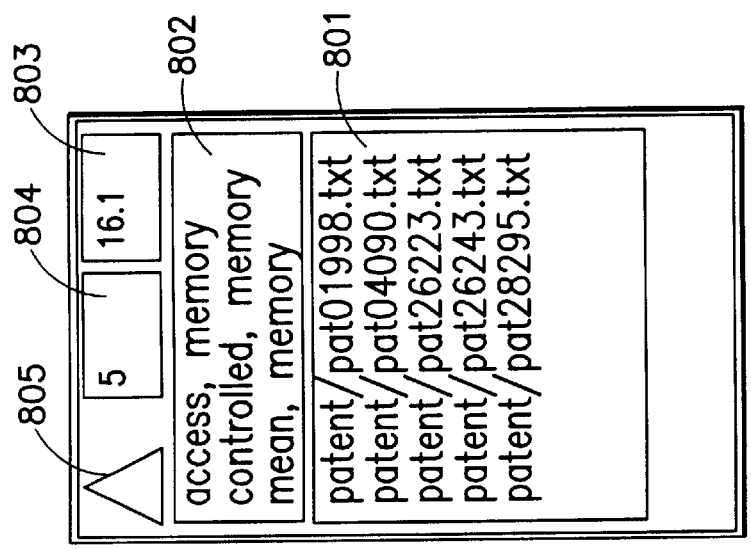

FIG. 8 shows a travel box with a first content; the travel box correspondes to middle travel point in FIG. 4 and shows in the upper part of the box a navigation arrow for upwards travel, an indication of distance to root (5 steps), the intra-cluster similarity. It shows in the upper middle part of the box all attributes available at that travel point. In the lower middle part of the box it shows the objects subsumed under travel point.

Figure 5:
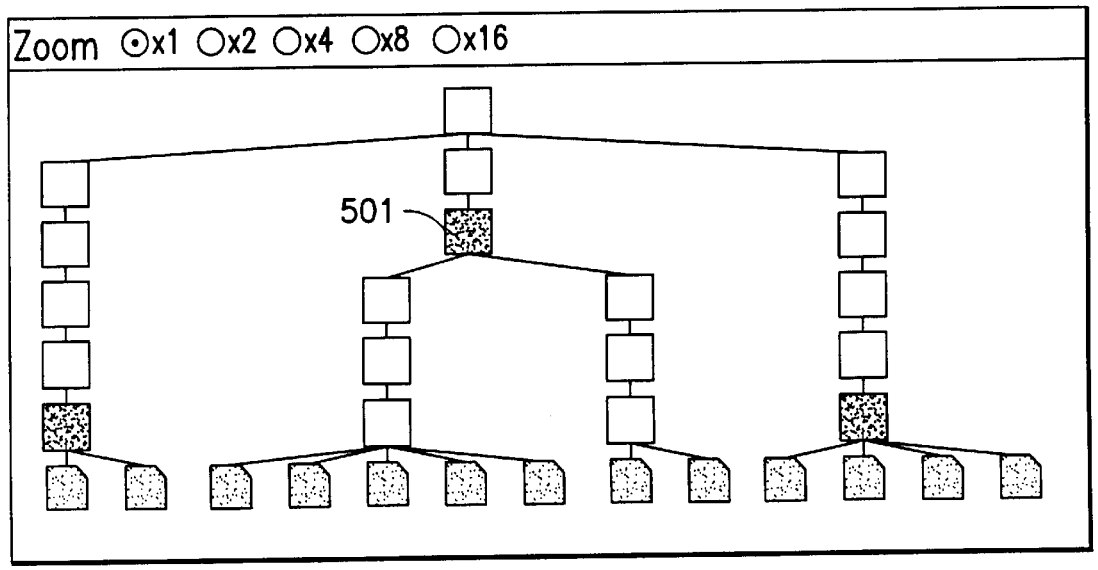
FIG. 5 depicts a tree view area with a moved middle travel point; by dragging a travel point upwards (or downwards) the node is expanded and all subsumed nodes are displayed.
Figure 9:
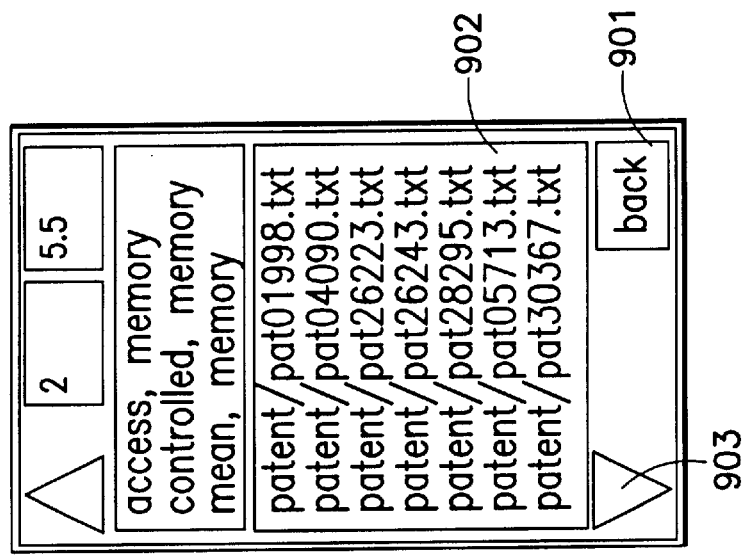

FIG. 9 shows a travel box with a second content; the travel box corresponds to middle travel box in FIG. 5. Additionally in the lower part of the box the control element for navigating downwards is visualized allowing to navigate downwards within the tree structure to the next node specified by the object which is highlighted in the lower middle box. The "back" button moves the travel point to the "historically" previous travel point (history function).

Figure 10:
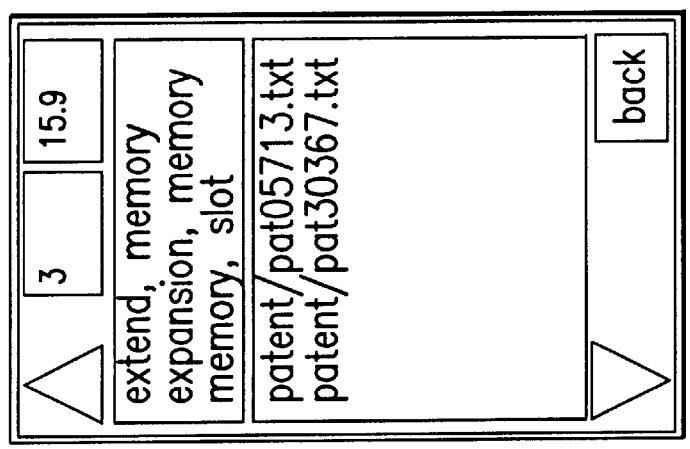

FIG. 10 shows a travel box with a third content corresponding to middle travel box in FIG. 7.

Figure 11:
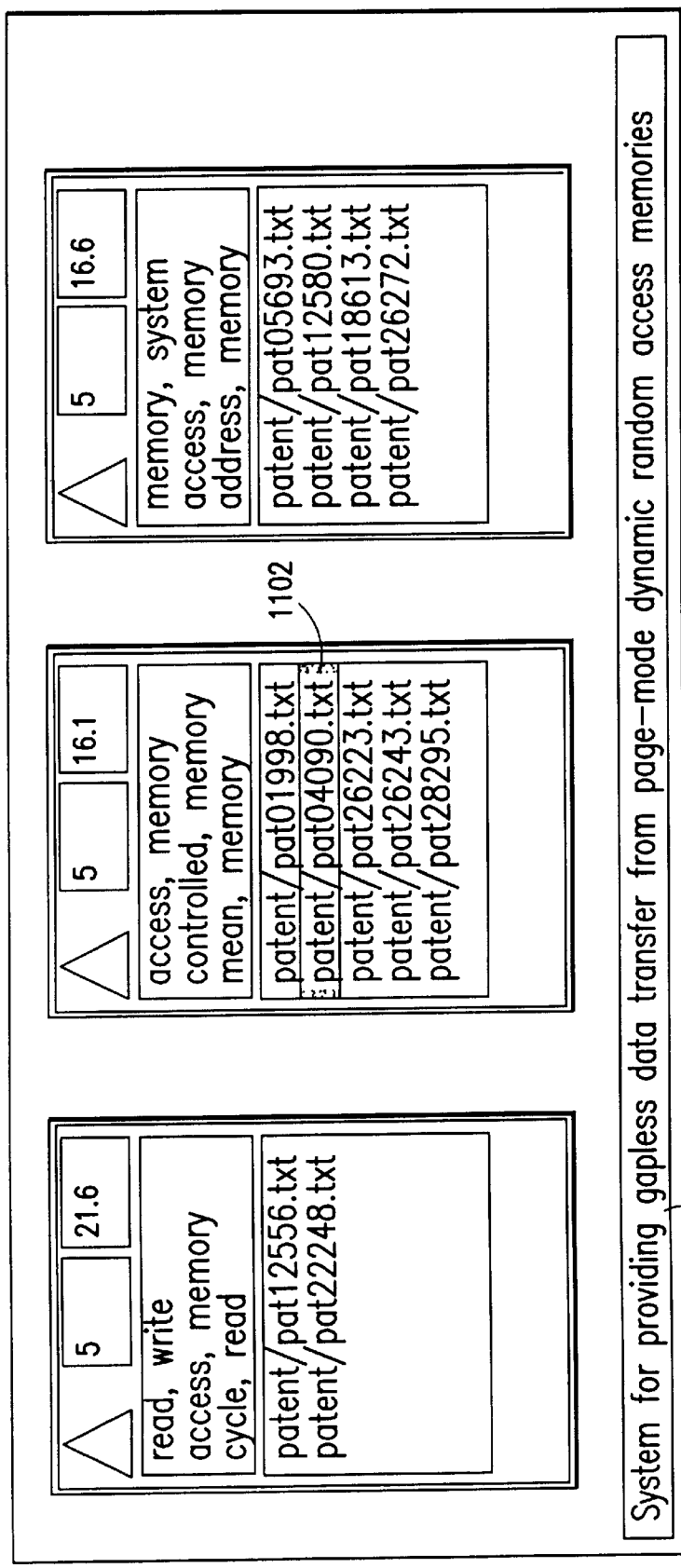

FIG. 11 visualizes all three travel boxes corresponding to the travel points of FIG. 4. Activation, i.e. selection of a document in a travel box displays more information about the document, for example its title.

Figure 12:
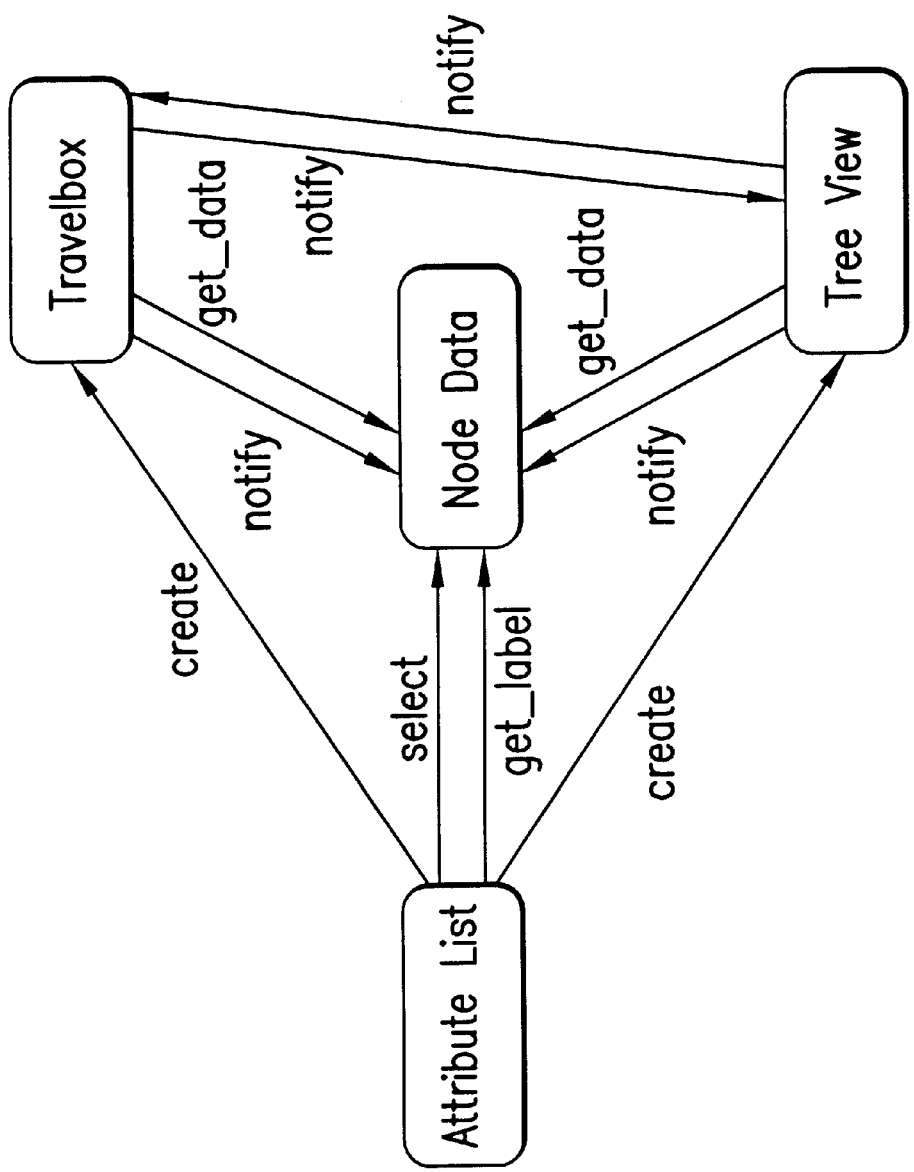

FIG. 12 reflects the main interactions between the described implementaion object types.

4 DESCRIPTION OF THE PREFERRED EMBODIMENT

The current invention may be applied to any type of hierarchical structure comprising a tree of nodes. The tree structure may be of any complexity and depth. The leaf nodes in said tree-structure may represent any type of objects. Objects according to this terminology can be understood generally as a collection of data treated as a unit. Further the objects may be associated with attributes of any nature for further characterization of the objects.

4.1 Introduction

The current invention is illustrated in application to the area of information mining technology in genearal or text mining technology in specific. This application area has been choosen only as information mining is confronted with especially large and complex tree structures on objects thus that a browser (also called a navigator) based on the current invention benefits evidently from the advantages of the suggested taching. By no means is the current invention limited to that particular application area of text mining.

The objects within this area of information mining are documents from any source, including transactions, e-mail, web pages, and other. Thus in the following the terms "object" and "document" are often used interchangeably. The typically huge number of documents in this area are then analyzed by determining the lexical affinities for each document. A lexical affinity is the correlation of a group of words, which appear frequently within short distance together throughout the given documents. Examples for lexical affinities are phrases like "online library" or "computer hardware". Lexical affinities are generated dynamically, thus they are specific for each collection. Within this application example the determined lexical affinities are the attributes according to above general definition associated with the individual documents. Clustering technology is then applied using lexical affinities as the base terms and measures similarity between the documents (i.e. between the objects) by comparing vectors of these terms. The goal and result of cluster analysis is the determination of a set of clusters, or a clustering, such that inter-cluster similarity is minimized and intra-cluster similarity is maximized. A cluster could be defined as a group of objects whose members are more similar to each other than to the members of any other group. Thus the clustering is used to segment a document collection into subsets, the clusters, with the members of each cluster being similar with respect to certain interesting features. The clusters are arranged in a hierarchical clustering tree where related clusters occur in the same branch of the tree and the similarity within the clusters decreases moving upward to the root of the clustering tree. Thus within the tree the individual documents represent the leaf nodes and the innner nodes (non leaf nodes) represent document clusters of decreasing similarities as one moves upwards to the root of the tree. Moreover the innner nodes (non leaf nodes) are associated with all the attributes of all nodes of their sub-tree.

Such tree structures might get very deep containing a lot of clusters with only a few documents. Therefore sometimes configurable slicing techniques are applied in a further processing step. Clusters within the same branch that have a comparable intra-cluster similarity are merged into a single cluster. This reduces the depth of the tree and eases browsing or further processing.

The basic approach of the current invention is to provide a simultaneous "multi-dimensional" view on the tree structure which can be fine-tuned by the user's interests. Basically three dimensions can be identified: a first dimension relating to the navigation location within the tree structure; a second dimension relating to the information represented by the individual nodes; a third dimension relating to the attributes characterizing the collection of documents. Each dimension can be viewed in parallel to all other dimensions and manipulations or navigation in one dimension might affect the presentation of the other dimensions simultaneously. In that sense the current invention teaches an orthogonal browsing or orthogonal navigation approach.

4.2 Overview on the Orthogonal Browser

Figure 1B:
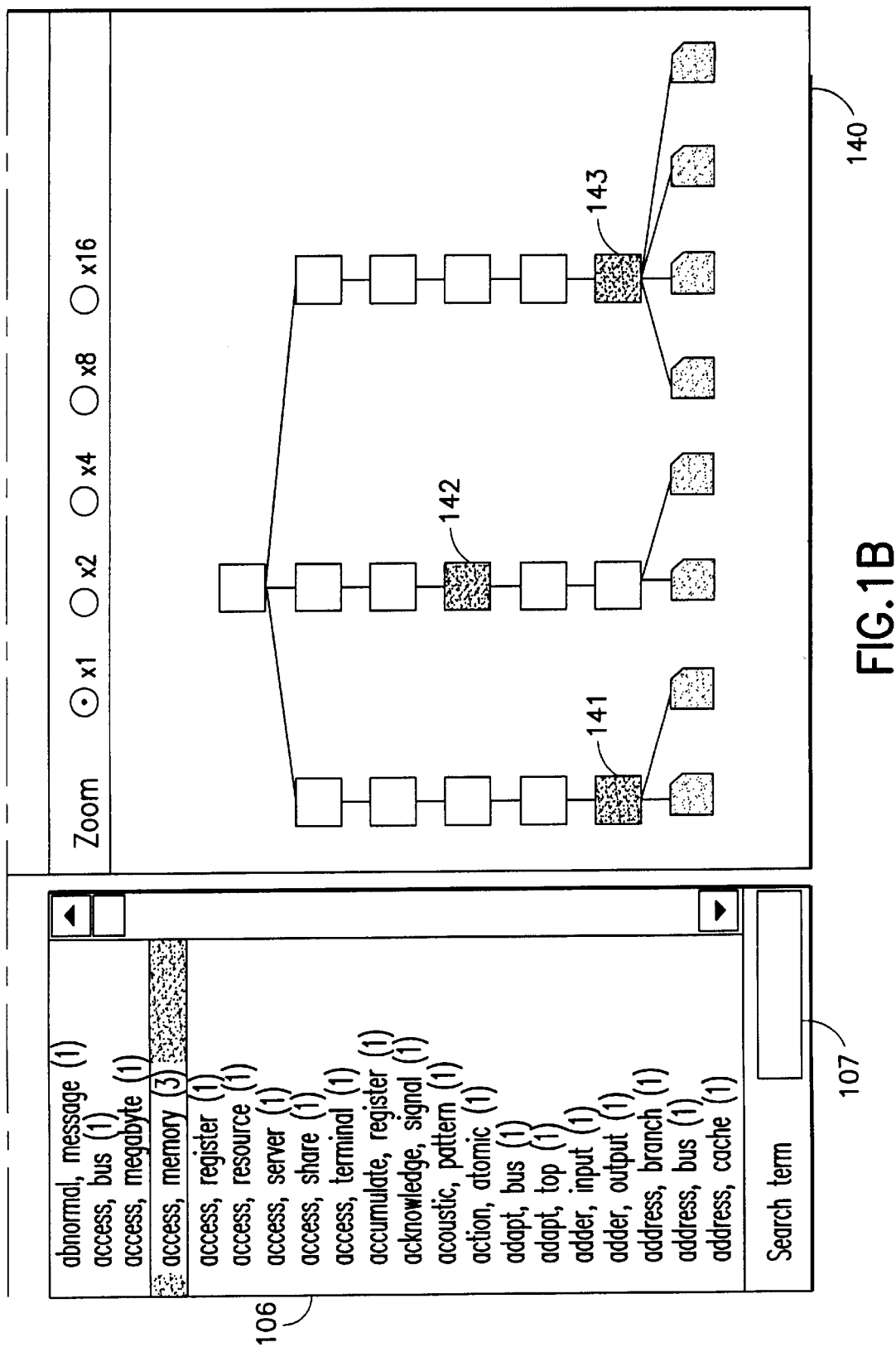

FIG. 1 gives an overview of the GUI navigator which combines the elements of the three exploration dimensions.

In the upper left area (101) of the navigator the name of the collection to be browsed is given, together with some informational data about values used for the collection generation ("top threshold" (102), "bottom threshold" (103), "slices" (104)—the previous parameters configuring the processing of the slicing technique—and number (105) of documents in collection). Each element in the area (101) represents a separate tree structure selectable by a user for navigation.

When the user accesses the hierarchy for the first time he is prompted with an attribute select box visualized in the attribute list area (106); the attribute list area is also visualized in greater detail in FIG. 2. The attribute list is searchable: the user can enter a search term in the bottom field (107) and the highlighted area in the attribute list will jump, as depcited in greater detail in FIG. 3, to the attribute (301) which is located orthographically closest to the search term.

An attribute can be selected from the attribute list in one of three different ways:

The user can use the scroll-bar (302) on the right side of the attribute select list to scroll through the alphabetically ordered list of attributes.

Entering a search term in the respective bottom field (107) jumps right to the spot in the list view which is orthographically closest to the search term.

If a user is interested in only those lexical affinities which occur at least n times, n can be entered in the search field titled "min. frequency" (108) and then click into the attribute list. Only those attributes which occur at least n times are then displayed.

Of course one can combine the different selection mechanisms, for example first narrow down the number of attributes displayed by using the min. frequency search and then do an orthographical search on the result.

4.2.1 Navigation by Selecting an Entry Point

Clicking on any attribute in the attribute list triggers the representation method to perform the following activities:

After selection of an object attribute from the attribute list area, showing the object attributes of the tree structure, those non-leaf nodes, which are the direct parent nodes of leaf nodes associated with said selected object attribute, are determined. These non-leaf nodes are then selected as so-called travel points.

In the lower right panel, the tree view area (140), the complete tree is visualized in a specific manner. In greater detail the depicted tree is visualized in FIG. 4 for the current situation. The current travel points (401, 402, 403) are marked visually representing in "green" the current position of the clusters. With respect to the tree structure between the current positions and the root of the tree the direct path from the current positions, i.e. the current travel points, up to the root is shown only. With respect to the tree struture underneath the current travel points the complete sub-trees of the current travel points are represented in the tree view area. FIG. 4 is representing exactly this initial situation with respect to the determined travel points. At the lowest level of the tree the individual objects, i.e. documents, are represented.

As further representation step after selecting travel points in the upper right panel (108) for each of the travel points (for example 141, 142, 143) a so-called travel box (110, 120, 130) is represented; i.e. each cluster containing the particular attribute is assigned a travel box. Further details of the layout of a travel box is reflected in FIG. 8.

The lower part (801) of each travel box represents all the documents, i.e. all leaf nodes of the tree, in the current cluster (i.e. underneath the current travel point). That is, all documents which are subsumed under the actual node, irrespective of their distance to the actual node. These documents can be opened and read by double-clicking (indicating an object is visualization request), or have their titles displayed (refer for instance to FIG. 11 and the field (1101)) by single-clicking the object identification (1102).

In the middle part (802) the N (in the current case N=3) most significant lexical affinities of the travel point (cluster) are shown.

In the upper right (803) of each object view panel, i.e. travel box, the similarity of the documents in the respective cluster is indicated in %.

In the upper middle (804) the distance between the current cluster and the root is indicated, i.e. the number of parent nodes from the current travel point to the root of the tree is displayed.

When a travel box is activated by clicking (for example (120) in FIG. 1), the respective travel point (142) in the tree panel turns color from green to red, i.e. is marked visually.

4.2.2 Navigation by Upward and Downward Movements in the Tree

The user can either navigate in the object view panel (108), i.e. via the travel boxes (110, 120, 130), or in the tree view panel (140) via the travel points (141, 142, 143). The navigation step is always mirrored in both panels. This guarantees in a unique and systematic way that the "flat" content-centered view represented by the travel boxes is always related with the hierarchical, collection-structure-centered view on the data. "Flat" in the current context means that all leaves of the sub-tree of a certain travel point are displayed suppressing the the complete tree structure below said travel point.

Navigation in the object view panel (108):

Clicking on the upper green button of a travel box (refer for instance to (805) in FIG. 8) results in all documents of the parent node being displayed, thus for an upward navigation step the upper green button has the function of an upward control element. This action is mirrored in the tree view panel by the travel point representing the current position being moved one step upwards.

Clicking on the "back" button (refer for instance to (901) in FIG. 9) takes the user back to the previous position. The navigator acording the current invention is storing identifactions for each visited travel point during navigation in the tree in a history record. This enables for the explained navigation step with respect to history.

If the current node (i.e. travel point) has more than one daughter node the user has the additional option of selecting a particular document (this selection servers the purpose of specifying a certain daughter-node or child-node) by single-clicking on it, refer for instance to "patent/pat05713.txt" (902) in FIG. 9, and then clicking on the lower green button (903) representing a downward navigation control element initiating a downward navigation step. That takes the user to the branch which contains the specific document. Thus the navigation can be document-centered and the user has the opportunity to learn more about the content available at certain structural nodes.

Navigation in the tree window panel (140):

Clicking on one of the green travel points, for instance (141, 142 or 143) activates it and turns it red. The active part can then be dragged up or down the branch, causing the tree to unfold or fold. The respective documents in the branch and the statistics are displayed in the travel box representing the particular travel point.

Example: Assume the middle travel point (401) within FIG. 4, corresponding to the respective travel box in FIG. 8, has been moved upward in FIG. 5 to (501), now being represented by the travel box in FIG. 9. This process can be iterated, as is shown in FIG. 6. As soon as a travel point subsumes more than one branch, the user has either the option to refold the tree the way he unfolded it by pressing the "back" button (901) in FIG. 9. Or he can select a document, for instance (902), and refold the tree via (903) in such a way that the branch leading to the selected document is followed. Doing this in the travel box represented by FIG. 9 may lead to the travel box in FIG. 10, paralleled by the tree view in FIG. 7. Therefore the travel point (601) has been moved to the new position (602) resulting in FIG. 7.

4.2.3 Navigation by Zooming into the Tree

If the root node of the tree is selected, the tree becomes very unreadable and the information hidden in the structure is not accessible any more. Therefore the current invention offers the facility to zoom into the tree by choosing one of the zoom factors (refer to the zoom facility for instance (410) in FIG. 4). After selecting a zoom factor, scrollbars can be used to select the desired part of the tree.

4.2.4 Navigation by Visualization of Individual Objects

A document, i.e. object, can be opened by double-clicking thus allowing for object visualization. An object may be selected eiter in the tree view area (for instance (140)) or from within a travel box (for instance (902) in FIG. 9).

Furthermore, if the document is in a format which has tags for the title, the title of the document is displayed (refer for instance to (1101) in FIG. 11) in the line underneath the document windows when the document is selected (1101).

4.3 Implementation

The object structures described below are the base objects of the preferred implementation. Insofar the term "object" in this context relates to the programm-technical implementation (for instance based on object-oriented technologie) and may not be intermixed with the "objects" (i.e. the objects associated with attributes representing the leaf nodes of the tree structure) which may be browsed with the navigator.

4.3.1 Base Objects of the Implementation

The attribute list object, representing the program technical implementation of the attribute list area (refer for example to (106)), contains all values that occur for the attribute that is used to select the clusters to be displayed. In our example the attributes are also used as cluster labels, i.e. as labels of the travel points. In other contexts when other types of objects are displayed more than one attribute can be used to select the objects. Thus the conceptual implementation of the attribute list object is:

---
Attribute List:
values (list)

---

The node data objects, representing the program technical implementation of the nodes in the tree structure potentially selectable as travel points, represent the clusters. They are kept in an array structure. The node data objects refer to each other with respect to their hierarchical relations. Thus every node data object points to its parent and keeps a list with pointers to its children. A cluster will only be displayed in the tree view when the is InTreeView flag of its node data object is set. For clarification of the terms: With tree view we refer to the visualization of the tree view object, representing the program technical implementation of the tree view area (refer for example to (140)). Respectively a node and its node data object and a travel box and its travel box object are differentiated. The isVisible flag indicates whether a node data object has a travel box representation and thus a travel box object. The associated nodes are marked green (or red) in the tree view; One of the green nodes and/or its travel box can be selected as travel point. The selected travel point is displayed red in the tree view, its travel box is highlighted, and the isSelected flag of its node data object is set. At most one node can be selected as travel point. Thus the conceptual implementation of the node data object is:

---
Node Data:
child (list of pointers)
parent (pointer)
isSelected (flag)
isVisible (flag)
isInTreeView (flag)
label(text)
document (text)
similarity (number)
distance from root (number)

---

The travel box object, again representing the program technical implementation of a travel box (refer for example to FIG. 9, contains a pointer to the node data object it represents. Additionally an undo stack keeps track of all previous navigation actions related to this travel box object; thus this feature implements a "history record". These actions are the up and down movements in the hierarchy. Thus the conceptual implementation of the travel box object is:

---
Travelbox:
node (pointer)
undo stack (last 10 positions)

---

The tree view displays the nodes for which the is InTreeView flag is set. A "node" as defined above, as the visualization of a node data object, has no is InTreeView attribute itself. For readability the distinction between these two node types is not always made explicit in the text. The zoom factor can be adjusted and is stored in the tree view object. The tree view object keeps a pointer to the current travel point. Thus the conceptual implementation of the tree view is:

---
Tree View:
zoom factor (number)
selected node (pointer)

---

4.3.2 Interaction of Implementation Objects

FIG. 12 shows the main interactions between the described implementaion object types.

The attribute list object builds up its list of values by iterating over the node data object array and accessing the label fields. When a cluster label or more generally an attribute value is selected in the attribute list by user interaction three things happen:

The attribute list object selects the respective node data objects. This is done by searching in the node data array for nodes with the respective attribute value. For each of these node data objects the isVisible flag is set. Starting with these nodes the algorithm determines which nodes are visible in the tree view (is InTreeView flag is set).

Additionally the attribute list object initiates the creation of travel box objects for each travel point (a node data object that has its is Visible flag set).

The attribute list triggers the creation of the tree view object.

When a travel point in the tree view is selected, it changes color from green to red, and the following happens:

The isSelected flag in the corresponding node data object is set.

Additionally the tree view object notifies the corresponding travel box which becomes highlighted.

When the travel point is moved up or down in the tree view, the following actions are taken:

The tree view object notifies the associated node data objects. The node data object associated with the previous travel point unsets its isSelected flag as well as its isVisible flag. The node that now has become the new travel point sets these two flags.

To update its display the tree view object processes the hierarchical connections between the nodes data to trigger the update of their is InTreeView flags. It then gets the updated information from the node data objects to redisplay the tree view.

The tree view object notifies the travel box object associated with the moved travel point. The document data that is displayed in the travel box is updated with data from the node data object of the new travel point. For this purpose all child links are followed and the document data is collected.

When a node is selected by user interaction and becomes the new travel point, the following actions are triggered:

The travel box is highlighted. If another travel box was selected before it will not be highlighted anymore.

The node data object of the previous travel point is notified and changes its is Selected flag to unset.

The node data object associated with the travel box object is notified and sets its is Selected flag.

The travel box object notifies the tree view object which redisplays the tree view so that the color of the previous travel point changes from red to green and the color of the new travel point changes from green to red.

When the user navigates via a travel box the following happens:

The node data object associated to the travel box object before the movement is notified to unset its is Visible and its isSelected flag.

The node data object of the new travel point is notified to set its isVisible and its isSelected flag.

The isInTreeView flag for all node data objects in the node data object array is updated.

The travel box object changes the list of documents displayed so that all the documents are listed that belong to the node data objects and can be reached iteratively via the child pointers of the new travel point.

The travel box updates its movement history.

The tree view is notified that it has to update the display. Thus it gets the updated information from the node data object array.

Therefore, nodes data objects, tree view objects, and travel box objects are interconnected and always updated at the same time.

4.3.3 Position Calculations

The algorithm for calculating invisible parts in the tree view and horizontal position in the tree (this is required for proper display of the tree view) is delineated by the following Java code segement:

```
//
// traverse the tree recursively from current node n and depth d
// and set the values for
// depth and maxDepth (depth is the "distance" to the root node)
// horPos and maxHorpos    (all leafs are counted from left to right
//                          and are given a unique horizontal position
//                          for later displaying in the tree view)
// remember:
// "isVisible" means that there are travelBoxes displaying
// exactly this node
// "isInTree" means that the node is displayed in the treeView
//
public void updateRelations( int n, int d, boolean inTreeView )
{
    // when starting, initialize the maximal horizontal position
    if( n == 0 ) maxHorPos = 0;
    if( node[n] == null ) return;
    // we will see the node in the tree if
    // a) it is "visible" i.e. it exists a travelBox for the node
    // b) its parent is visible (i.e. inTreeView is true)
    // c) (later here) one of its child "isInTree"
    boolean seeNode = inTreeView || node[n].isVisible;
    // set the depth (distance from the root node)
    node[n].depth = d;
    if( node[n].isLeaf ) {
        if( seeNode ) {
            // for a visible (i.e. "inTree") node
            // set and increment the horizontal position
            node[n].horPos = maxHorPos++;
        }
        // inherit the visibility from the parent
        node[n].isInTreeview = seeNode;
        return;
    }
    node[n].isInTreeView = seeNode;
    int sumHorPos = 0;
    int nVisibleChildren = 0;
    // loop recursively over all children and check if
    // one of them is visible in the tree
    // summarize the horizontal pos
    for( int i=0; i<node[n].child.length; i++) {
        int iChild = node[n].child[i];
        node[ichild].parent = n;
        // recursive call for the child with depth+1 and
        // current visibility
        updateRelations( ichild, d+1, seeNode );
        if( d+1> maxDepth ) maxDepth = d+1;
        if( node[ichild].isInTreeView ) {
            node[n].isInTreeView = true;
            sumHorPos += node[iChild].horPos;
            nvisibleChildren++;
        }
    }
    if( nVisibleChildren>0 ) {
        // for positioning the node, Calculate the average
        // of all visible children
        node[n].horPos = sumHorPos / nVisibleChildren;
    }
    return;}
```

4.4 Additional Application of the Invention

The teaching according to the current invention can also readily be applied to a file system navigator.

A file system navigator according the state of the art would display a file selection box: When a user wants to open a file the content of the current directory will be presented in the selection box. Sometimes the file type (as a filter criterium) can be specified so that only files of a specific type are offered. Still all directories are displayed even if they themselves or none of their subdirectories contain a file of this type. When the user doesn't remember the location of the file which he wants to open a lot of directory paths have to be followed to find the document.

Applying the current teaching to this problem area files and directories would be represented as "objects". The hierarchical files system structure would be associated with the "tree structure". According to such an approach not only the file types but other attributes like author, format, creation date etc. and even terms occurring within the file contents can be offered for filtering. For each attribute a list of the values is offered so that the user can search and select the value he or she is looking for.

Instead of a file system navigator showing the complete file system tree (a user typical is not interested in) the file system navigator according the current invention drastically reduces the amount of data by cutting off unimportand data: only those files that match the selected value and those directories that contain a matching file are displayed. Thus the search tree for navigation is reduced significantly.

What is claimed is:

1. A file system navigator, comprising:

a first window displaying a listing of attributes of objects in a file system, each file, directory, and subdirectory in said file system corresponding to one of said objects;

an attribute selector for selecting one or more said attributes; and a second window displaying a customized tree-structure image of said file system, as based on which of said attributes is selected, said customized tree-structure image comprising a tree-structure representation of an entirety of said file system wherein only the objects in said file system having said selected one or more attributes are included in said tree-structure representation of said file system; and a third window including a travel box display, said travel box display comprising a representation of files in said file system that satisfy said selected one or more attributes, said travel box display further comprising a direction selector for selecting one of an upward travel direction in said file system and a downward travel direction in said file system, wherein said travel box display and said customized tree-structure image each change to reflect a selection made by said direction selector.

2. The file system navigator of claim 1, wherein said customized tree-structure image comprises a flat representation of objects that are files having said selected one or more attributes, plus a representation back to a root of said file system as being all objects of said file system that comprise subdirectories and directories that contain said files in said flat representation.

3. The file system navigator of claim 1, wherein said attributes comprise at least one of the following for each file:

file type;

file author;

file format, creation date; and terms occurring in said file.

4. The file system navigator of claim 1, wherein said attribute selector includes a selection of an attribute by a process of entering a search string via an input field.

5. The file system navigator of claim 1, wherein said first window provides a single contiguous listing of all attributes in said file system.

6. A method of navigating through an information space, said method comprising:

for each object in an information space, determining attributes of said object and determining a child-parent relationship of said object with other objects in said information space;

providing a display of said attributes in a first window, said display comprising a listing of at least a portion of said attributes;

providing an attribute selector for selecting one or more said attributes;

providing a customized tree-structure image of said information space in a second window, said customized tree-structure image dynamically based on which of said attributes is selected, said customized tree-structure image comprising a tree-structure representation of an entirety of said information space wherein only the objects in said information space directly related to said selected one or more attributes are included in said tree-structure representation; and providing a travel box display in a third window, said travel box display comprising a representation of objects in said information system satisfying said selected one or more attributes, said travel box display further comprising a direction selector for selecting one of an upward travel direction in said file system and a downward travel direction in said file system, wherein said travel box display and said customized tree-structure image each chance to reflect a selection made by said direction selector.

7. A system comprising means adapted for carrying out the method according to claim 6.

8. A data processing program for execution in a data processing system comprising software code portions for performing a method according to claim 6.

9. A computer program product stored on a computer-usable medium, comprising computer-readable program means for causing a computer to perform a method according to claim 6.

10. The method of claim 6, wherein said tree-structure representation comprises:

a flat representation of all objects in said information space containing said attribute; and a representation of parent objects back to a root of said information space.

11. The method of claim 6, wherein said attributes comprise lexical affinities contained in said objects.

12. The method of claim 6, wherein said first window provides a single contiguous listing of all attributes in said information space.

13. An information space navigator of claim 6, comprising one of:

an apparatus executing said method; and a computer programmed to execute said method.

* * * * *